US008208453B2

(12) United States Patent
Tao

(10) Patent No.: US 8,208,453 B2
(45) Date of Patent: Jun. 26, 2012

(54) METHOD AND SYSTEM FOR REALIZING SERVICE REALLOCATION

(75) Inventor: Chuanhui Tao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 614 days.

(21) Appl. No.: 12/370,179

(22) Filed: Feb. 12, 2009

(65) Prior Publication Data

US 2009/0168675 A1 Jul. 2, 2009

Related U.S. Application Data

(63) Continuation of application No. PCT/CN2007/001658, filed on May 22, 2007.

(30) Foreign Application Priority Data

Aug. 15, 2006 (CN) .......................... 2006 1 0115819

(51) Int. Cl.
*H04W 4/00* (2009.01)
(52) U.S. Cl. ........................................ 370/338; 455/453
(58) Field of Classification Search .......... 370/328–329, 370/335–336, 338, 341–343, 345, 437, 442–443, 370/465, 230, 230.1, 231, 235; 455/422.1, 455/435.1–435.3, 450, 452.1–452.2, 453
See application file for complete search history.

(56) References Cited

U.S. PATENT DOCUMENTS 7,224,971 B2 * 5/2007 Noguchi et al. ........... 455/435.1
7,340,250 B2 * 3/2008 Sanchez ....................... 455/433
7,369,854 B2 * 5/2008 Gallagher et al. ........... 455/436
7,471,957 B2 * 12/2008 Palkisto et al. .............. 455/458
7,773,993 B2 * 8/2010 Gallagher et al. ........... 455/436
2003/0031160 A1 * 2/2003 Gibson Ang et al. ........ 370/349

(Continued)

FOREIGN PATENT DOCUMENTS

CN           1499852 A        5/2004

(Continued)

OTHER PUBLICATIONS

"3$^{rd}$ Generation Partnership Project; Technical Specification Group Services and System Aspects; Intra-Domain Connection of Radio Access Network (RAN) Nodes to Multiple Core Network (CN) Nodes (Release 5)," *3GPP TS 23.236*, V5.4.0: 1-36 (Sep. 2005).

(Continued)

*Primary Examiner* — Chi H. Pham
*Assistant Examiner* — Kevin Mew
(74) *Attorney, Agent, or Firm* — Leydig, Voit & Mayer, Ltd.

(57) ABSTRACT

A method and system for realizing service reallocation of core network are provided. The method includes the following steps. A load shunting flag and a shunting proportion corresponding to a core network node are configured in a radio network controller (RNC). When the RNC receives a message of a user and determines that the service requested by the user is a registration service, the core network node corresponding to the registration service is acquired. If the core network node has no load shunting flag, the core network node is selected. If the core network node has the load shunting flag, a load shunting is performed according to the configured shunting proportion of the core network. All the scenes that need the load reallocation can be realized simply and expediently by utilizing the method.

19 Claims, 5 Drawing Sheets

U.S. PATENT DOCUMENTS

| | | | |
|---|---|---|---|
| 2004/0066774 A1 | 4/2004 | Kawaguchi et al. | |
| 2010/0124926 A1* | 5/2010 | Klatt et al. | 455/435.2 |
| 2011/0206006 A1* | 8/2011 | Chindapol et al. | 370/331 |
| 2011/0281581 A1* | 11/2011 | Brandt et al. | 455/427 |

FOREIGN PATENT DOCUMENTS

| | | |
|---|---|---|
| CN | 1710878 A | 12/2005 |
| EP | 1282321 A2 | 2/2003 |
| JP | 2004-153804 A | 5/2004 |
| WO | WO 2006/031157 A1 | 3/2006 |

OTHER PUBLICATIONS

1st Office Action in corresponding Chinese Application No. 200610115819.8 (Jul. 17, 2009).

Written Opinion of the International Searching Authority in corresponding PCT Application No. PCT/CN2007/001658 (Aug. 30, 2007).

European Search Report in corresponding European Application No. 07721231.4 (Sep. 24, 2010).

1st Office Action in corresponding European Application No. 07721231.4 (Oct. 8, 2010).

3GPP TS 23.236, "Digital cellular telecommunications system (Phase 2+); Universal Mobile Telecommunications System (UMTS); Intra-domain connection of Radio Access Network (RAN) nodes to multiple Core Network (CN) nodes (Release 6)," Mar. 2006, Version 6.3.0, 3rd Generation Partnership Project, France.

3GPP TS 23.060 Draft, "Technical Specification Group Services and System Aspects; Digital cellular telecommunications system (Phase 2+); General Packet Radio Service (GPRS); Service description; Stage 2," Dec. 1999, Version 3.2.0, 3rd Generation Partnership Project, France.

3GPP TS 23.236, "Technical Specification Group Services and System Aspects; Intra-domain connection of Radio Access Network (RAN) nodes to multiple Core Network (CN) nodes (Release 5)," Sep. 2005, Version 5.4.0, 3rd Generation Partnership Project, France.

3GPP TS 23.236, "Technical Specification Group Services and System Aspects; Intra-domain connection of Radio Access Network (RAN) nodes to multiple Core Network (CN) nodes (Release 6)," Mar. 2006, Version 6.3.0, 3rd Generation Partnership Project, France.

TS 24.008, "Universal Mobile Telecommunications System; Mobile radio interface layer 3 specification, Core Network Protocols—Stage 3," Jul. 1999, Version 3.0.0, 3rd Generation Partnership Project, France.

TS 25.331, "Technical Specification Group (TSG) RAN; Working Group 2 (WG2); RRC Protocol Specification," Apr. 1999, Version 1.0.0, 3rd Generation Partnership Project, France.

TS 25.413, "Technical Specification Group (TSG) RAN, RANAP Specification," Apr. 1999, Version 1.0.0, 3rd Generation Partnership Project, France.

3G TS 29.002, "Technical Specification Group Core Network; Mobile Application Part (MAP) specification," May 1999, Verson 3.0.0, 3rd Generation Partnership Project, France.

* cited by examiner

METHOD AND SYSTEM FOR REALIZING SERVICE REALLOCATION

CROSS-REFERENCE TO RELATED APPLICATIONS

This application is a continuation of International Patent Application No. PCT/CN2007/001658, filed May 22, 2007, which claims priority to Chinese Patent Application No. 200610115819.8, filed Aug. 15, 2006, both of which are hereby incorporated by reference in their entirety.

FIELD OF THE INVENTION

The present invention relates to the field of network communication technique, and more particularly to a method and system for realizing a service reallocation.

BACKGROUND

Recently, in order to solve the problems of network backup and resource sharing, IU FLEX concept is introduced into third generation partnership projects (3GPP) protocol. In other words, a universal terrestrial radio access network (UT-RAN) supports an intra domain connection routing function from one radio access network (RAN) node to a plurality of core network (CN) nodes, and allows the RAN node to route the information to different CN nodes in a corresponding circuit switched (CS) domain or a packet switched (PS) domain.

POOL AREA concept is introduced into the IU FLEX technique, and one pool area is a collection of one or more RAN node service areas. The pool area is composed of a plurality of CN nodes equally, and the CN nodes share the communication amount with one another in the pool area. A mobile switching centre (MSC) collection in the pool area is referred to as an MSC pool. A serving GPRS supporting node (SGSN) collection in the pool area is referred to as an SGSN pool.

A user equipment (UE) may roam in the pool area without changing the serving CN node. One pool area may serve several parallel CN nodes, and the pool area may separately configure the CS domain and the PS domain. From the perspective of the RAN, the pool area includes all the location areas/routing areas (LA/RA) of the one or more RNCs served by a group of parallel CN nodes, and the group of CN nodes may serve the LA/RA outside the pool area and may also serve other pool areas. The group of CN nodes may be the corresponding MSC pool or SGSN pool. A plurality of CN nodes in one area pool may realize the load balance, and the serving coverage provided by the plurality of CN nodes is much larger than the service area provided by a single CN node, which thus reduces node update, handoff, and relocation among the CNs, thereby reducing the update flow of a home location register (HLR).

All the CNs in the IU FLEX networking belong to the same operator. In addition, multi-operator CN (MOCN) characteristic is introduced into the 3GPP, the MOCN networking has the CNs of a plurality of operators. The CN of one operator may be the POOL of one CN, CS is the MSC pool, and the PS is the SGSN pool.

It is known that one RNC is connected to the nodes of a plurality of CNs of the same operator (PLMN) simultaneously in the IU FLEX networking manner, and one RNC is connected to the nodes of a plurality of CNs of different operators (PLMN) simultaneously in the MOCN networking manner, in which each operator may have a plurality of CNs.

FIG. 1 is a networking diagram of a typical MOCN and IU FLEX.

Three operators are involved, namely, a CN of operator A, a CN of operator B, and a CN of operator C. The CN refers to the MSC or the SGSN. If the CN of the operator A is the MSC, a collection of MSC-A1, MSC-A2, and MSC-A3 is referred to as the MSC pool. If the CN of the operator A is the SGSN, a collection of SGSN-A1, SGSN-A2, and SGSN-A3 is referred to as the SGSN pool.

The load of the CN is balanced, the load reallocation after the failure is restored is realized, or the load reallocation after the certain MSC or SGSN exits from or adds to the service is realized through a service load reallocation solution by utilizing the networking structure. The process is realized by cooperating the CN and the RNC.

The process of the load reallocation of the CS domain is shown in FIG. 2.

It is assumed that the MSC1 is shunted, and O&M respectively set a shunting flag on the RNC and the MSC1.

1. The UE under the MSC1 initiates an initial direct transfer message, the RNC resolves a network resource identifier (NRI) value in an intra domain non-access stratum (NAS) node selector (IDNNS) after receiving the message, wherein the NAS selects the MSC1 through the IDNNS CN selecting algorithm, and the RNC sends a location registration message in the initial direct transfer message to the MSC1.

2. The MSC1 receives the location registration message, determines that the UE is the user of this MSC, and performs a subsequent location registration flow.

3. The CN initiates a flow relating to the security function.

4. The MSC1 determines that this MSC has a load shunting flag, the location registration message includes a reallocated temporary mobile subscriber identity (TMSI) and unbroadcasted location area information (LAI), and the TMSI includes a null network resource identifier (NULL-NRI).

5. The UE sends a TMSI reallocation complete message to the MSC1.

6/7. A flow of releasing the location registration of this time is initiated.

8. The location registration flow is reinitiated after the UE receives a location registration accept message and finds that the LAI is unbroadcasted. After receiving the initial direct transfer message, the RNC resolves the NRI value (should be NULL-NRI) in the IDNNS, and the RNC selects one MSC without the load shunting flag in the MSC pool by using the NULL-NRI.

9. The RNC sends the location registration message in the initial direct transfer message to the selected MSC.

10. The MSC initiates a subsequent normal location registration flow after receiving the location registration flow.

The process of the load reallocation of the PS domain is shown in FIG. 3.

It is assumed that an SGSN1 is shunted, and O&M respectively set the shunting flag on the RNC and the SGSN1.

1. A UE under the SGSN1 initiates an initial direct transfer message, and after receiving the initial direct transfer message, the RNC resolves an NRI value in an IDNNS, selects the SGSN1 through the IDNNS CN selecting algorithm, and sends a routing area update (RAU) request message in the initial direct transfer message to the SGSN1.

2. The SGSN1 receives the RAU Request message, determines that the UE is the user of this MSC, and performs a subsequent RAU flow.

3. The CN initiates a flow relating to the security function.

4. The SGSN1 determines that this SGSN has a load shunting flag, and the RAU accept message includes a reallocated packet-TMSI (P-TMSI) and unbroadcasted routing area identity (RAI). A periodic RA update timer is set to a smaller value, and the TMSI includes an NULL-NRI.

5. The UE sends an RAU complete message to the SGSN1.

6/7. A flow of releasing the location registration of this time is initiated.

8. The UE reinitiates the RAU flow after the Periodic RA Update Timer reaches the set time, the RNC resolves the NRI value (should be NULL-NRI) in the IDNNS after receiving the initial direct transfer message, and the RNC selects one SGSN without the load shunting flag in the SGSN pool by using the NULL-NRI.

9. The RNC sends the RAU request message in the initial direct transfer message to the selected SGSN.

10. The SGSN continues the subsequent RAU flow after receiving the RAU request message.

It is known from the above flow that the process of realizing the load reallocation of the CN must be realized through the cooperation of the CN and the RNC in the solution of the prior art, thus having a high complexity. Furthermore, the shunting process is finished by performing the location registration flow twice for the CS domain, and the shunting process is finished by performing the RAU flow twice for the PS domain. Therefore, the performance of the existing network is seriously affected.

SUMMARY

Various embodiments of the present invention provide a method and system for realizing a service reallocation, thereby simply and expediently realizing all the scenes that need the load reallocation under a situation of IU FLEX networking or MOCN networking.

An embodiment of the present invention provides a method for realizing a service reallocation, wherein a load shunting flag and a shunting proportion corresponding to a CN node are configured in an RNC. The method includes the steps as follows.

The RNC acquires the CN node corresponding to a registration service when the RNC receives a message of a user and determines that a service requested by the user is the registration service.

The CN node is selected if the CN node has no load shunting flag.

A load shunting is performed according to the configured shunting proportion of the CN if the CN node has the load shunting flag.

An embodiment of the present invention provides a system for realizing a service reallocation, which includes a configuring unit, a determining unit, and a load processing unit.

The configuring unit is disposed on an RNC, and is adapted to configure a load shunting flag and a shunting proportion corresponding to a CN node.

The determining unit is adapted to determine whether a service requested by a user is a registration service.

The load processing unit is adapted to select the CN according to load relevant information, and perform a load shunting.

When the RNC receives a message of the user, and the determining unit determines that the service requested by the user is the registration service, the CN node corresponding to the registration service is acquired.

The CN node is selected if the CN node has no load shunting flag.

The load shunting is performed according to the configured shunting proportion of the CN if the CN node has the load shunting flag.

It may be known from the technical solution of the present invention that for the IU FLEX networking manner, it is only necessary to complementarily introduce the radio access including a Node B in the RNC and configure the load shunting flag and the shunting proportion corresponding to the CN node in the RNC, and thus the RNC is able to independently finish the load reallocation process of the CN. For the MOCN networking manner, it is only necessary to increase a network operator identifier corresponding to each CN node on the basis of the configuration information, and thus the RNC is able to independently finish the load reallocation process of the CN. During the particular implementation, the RNC differentiates the type of the service to be performed by the user according to a radio resource control (RRC) connection request, and separately processes the CS domain CN service and the PS domain CN service, or the RNC resolves an NAS part in an initial direct transfer message, and identifies LU of the CS, ATTACH of the PS, and the initial direct transfer of the RAU message, so as to separately process the CS domain CN service and the PS domain CN service without mutual effects. In the method of independently finishing the reallocation of the CN by the RNC, it is not necessary to modify other network elements, and interface protocols are not affected either. Therefore, the implementation is simple and expedient.

DETAILED DESCRIPTION

In order to have a better understanding of above solutions of the present invention, a detailed description is given below with embodiments and accompanying drawings.

Figure 1:
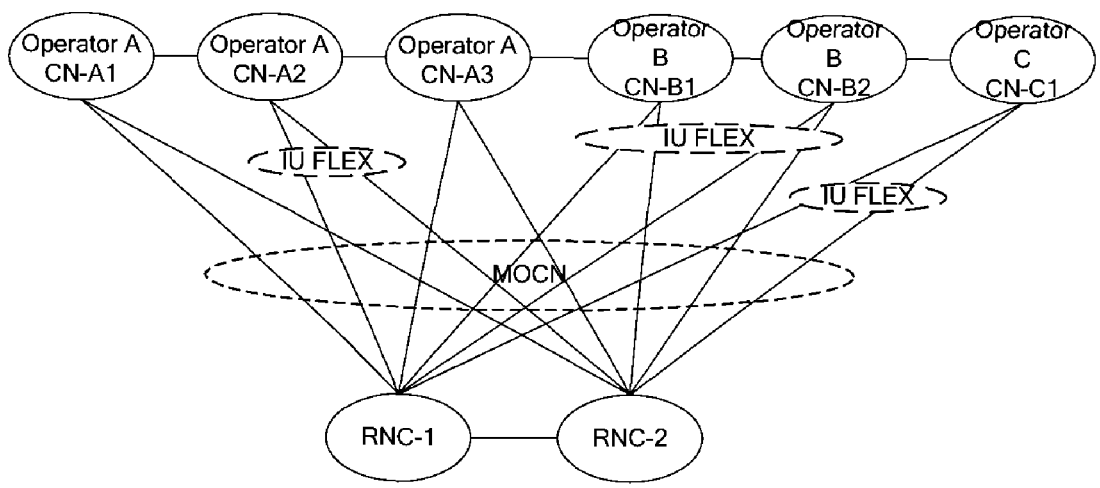
FIG. 1 is a schematic view of typical MOCN and Iu Flex networking.
Figure 2:
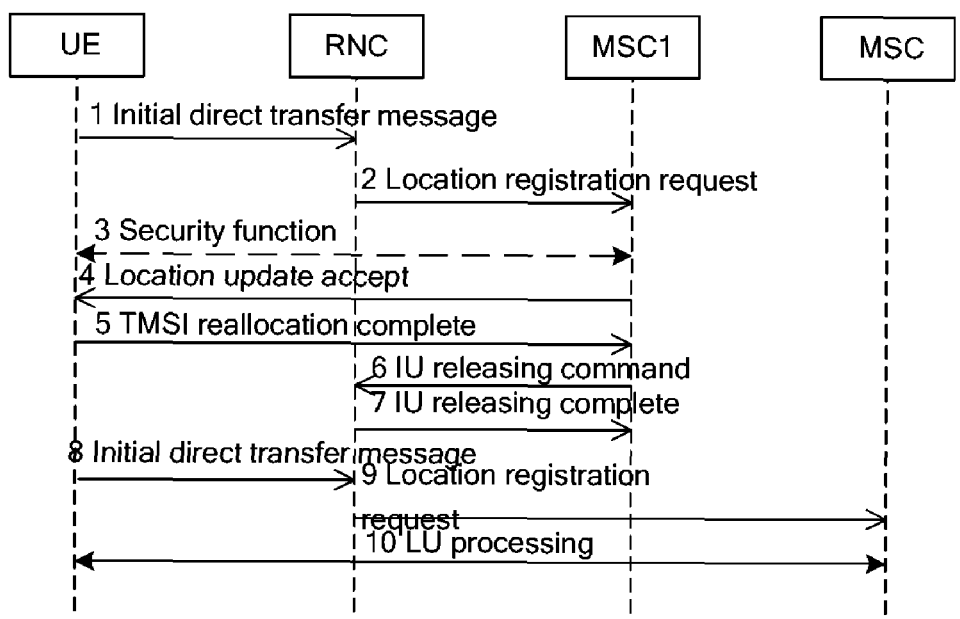
FIG. 2 is a flow chart of a conventional load reallocation of a CS domain.
Figure 3:
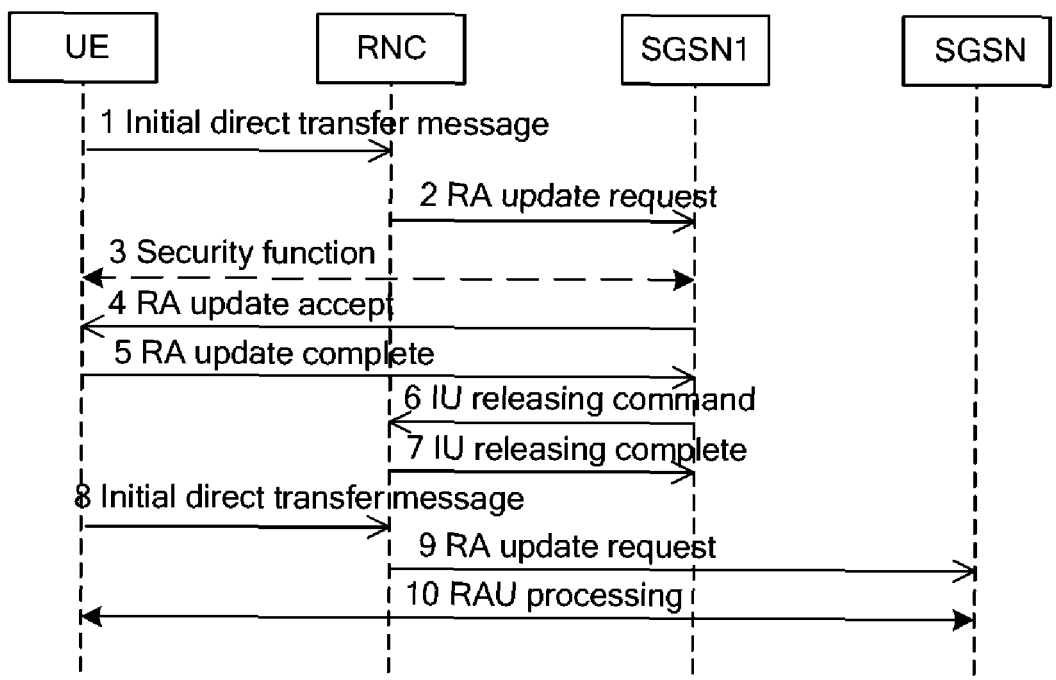
FIG. 3 is a flow chart of a conventional load reallocation of a PS domain.
Figure 4:
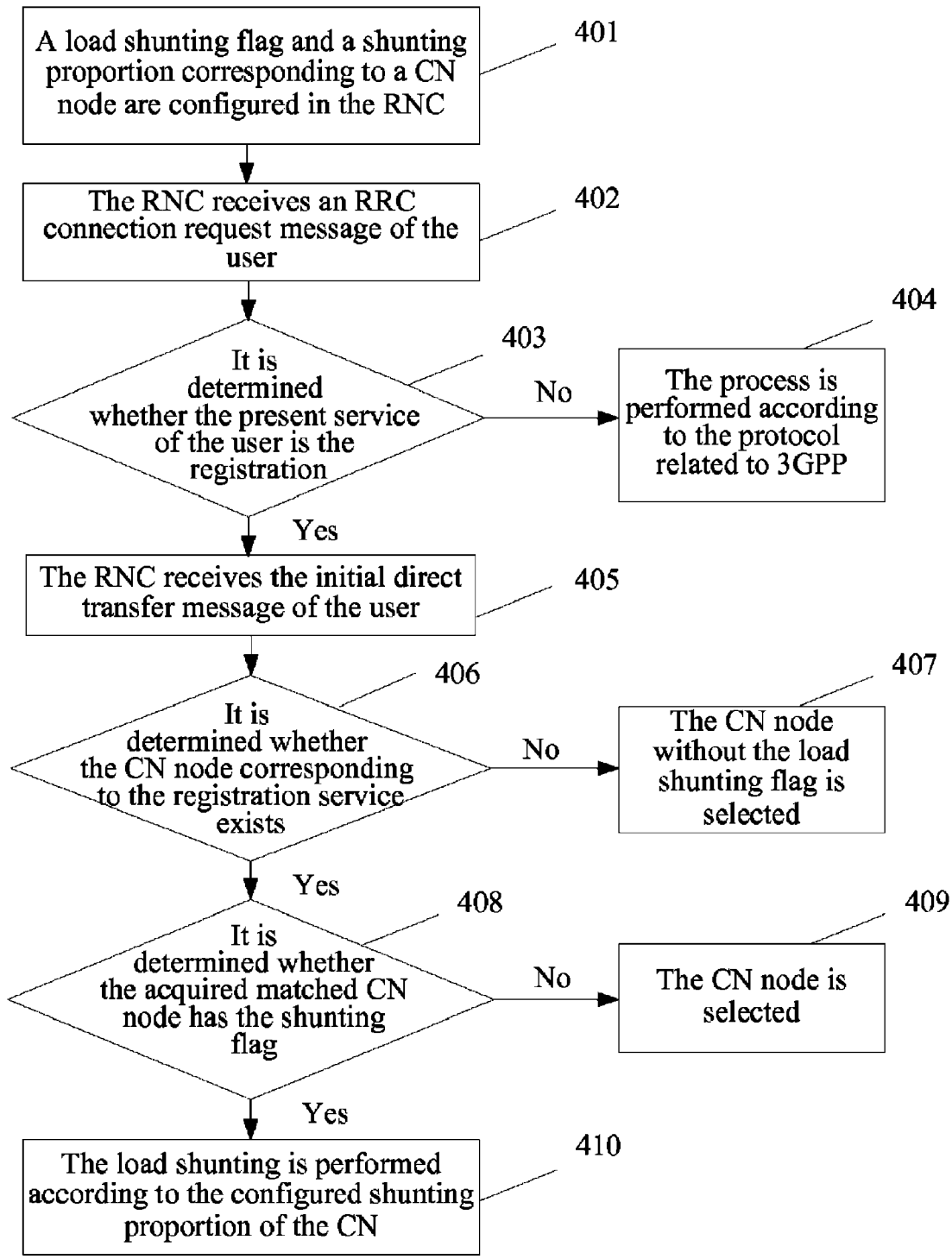
FIG. 4 is a flow chart of a method according to a first embodiment of the present invention.

Referring to FIG. 4, a flow chart of a method according to a first embodiment of the present invention is shown. This embodiment is directed to an IU FLEX networking manner, that is, a RNC is connected to a plurality CNs of the same operator, for a CS domain, the CN is an MSC, and for a PS domain, the CN is an SGSN.

The flow includes the steps as follows.

In Step 401, a load shunting flag and a shunting proportion corresponding to a CN node are configured in the RNC.

In the embodiment of the present invention, the RNC independently finishes the load reallocation of the CN, and it is necessary to configure the CN node which needs a load shunting and configure the corresponding load shunting flag and shunting proportion thereof in the RNC. The CN nodes of the CS domain and the PS domain are respectively configured by the MSC and the SGSN, and thus the shunting of the MSC and the SGSN is in the RNC. The RNC differentiates the service type to be performed by the user according to an RRC connection request to separately process the CS domain CN service and the PS domain CN service without mutual effects.

In addition, the RNC resolves an NAS part in the initial direct transfer message, identifies LU of the CS, ATTACH of the PS, and the initial direct transfer of the RAU message to separately process the CS domain CN service and the PS domain CN service without mutual effects.

In addition, in order to reduce the effect on the existing network service during the process of the service reallocation of the CN and ensure that the process of the service reallocation of the CN is performed in the reasonable time, a load shunting time period corresponding to the CN node is configured in the RNC, and the shunting time period includes a starting time and an ending time. The time period from the starting time to the ending time may be a continuous time period or a plurality of discontinuous time periods. Each continuous time period is an integral multiple of a periodical location registration period or of a periodical routing area update timer length. The periodical LU/RAU (location update/routing area update) time may serve as one unit, and the load shunting proportion may be respectively set in each unit. The load shunting flag, the starting time and the ending time of the load reallocation, and the shunting proportion may be respectively set in each CN node which needs the load shunting. At the same moment, the load shunting flags of all the CNs in the pool area cannot be set at the same time, so as to reduce the impact of the shunting process on the existing network.

For the newly increased CN or the CN restoring from the failure, it is necessary to reallocate the users in the pool area, and at this time, the total shunting proportion or the user number of a certain CN is evaluated according to the capacity of each CN in the current pool area. The load shunting flag, the starting time and the ending time of the load reallocation, and the shunting proportion of other CNs in the pool area are respectively set according to the above evaluation result.

If the certain CN starts to exit from the service, the load shunting flag, the starting time and the ending time of the load reallocation, and the shunting proportion corresponding to the CN node are set in the RNC. A smaller shunting proportion may be set in a first periodical RAU time or a periodical LU time during the network exiting, the shunting portion is gradually increased in the subsequent cycles, and the registration initial normal message with the shunting portion being 100% is shunted in the last several cycles. In this manner, the CN may quickly exit from the service with the minimum effect on the existing network.

In Step 402, the RNC receives an RRC connection request message of the user.

In Step 403, it is determined whether the present service of the user is the registration. If the present service of the user is not the registration, Step 404 is performed; otherwise, Step 405 is performed.

The RNC may confirm whether the present service of the user is the registration through a connection establishment reason cell in the RRC request message. The connection establishment reason is a mandatory cell in the RRC connection request message.

In Step 404, the process is performed according to the protocol related to 3GPP.

If receiving the initial direct transfer message, the RNC selects one CN node according to the IDNNS, and sends the initial UE message to the CN node.

In Step 405, the RNC receives the initial direct transfer message of the user.

In Step 406, it is determined whether the CN node corresponding to the registration service exists according to the received initial direct transfer information. If the CN node corresponding to the registration service does not exist, Step 407 is performed; otherwise, Step 408 is performed.

After receiving the initial direct transfer message of the user, the RNC knows whether the message comes from the CS domain or the PS domain according to domain flag information in the initial direct transfer message.

If the initial direct transfer message comes from the CS domain, the IDNNS is derived from the IMSI information carried in the message, the configuration information in the RNC is searched according to a value of the derived IDNNS, and the CN node MSC matching with the value of the IDNNS is acquired.

If the initial direct transfer message comes from the PS domain, the IDNNS is derived from the TMSI or the P-TMSI information carried in the message, the configuration information in the RNC is searched according to a value NRI of the derived IDNNS, and the CN node SGSN matching with the value NRI of the IDNNS is acquired.

It should be noted that after one RRC connection request, the user may merely initiate the initial direct transfer message of the CS domain, may also merely initiate the initial direct transfer message of the PS domain, and may also initiate the initial direct transfer messages of the CS domain and the PS domain at the same time. If the user initiates the initial direct transfer messages of the CS domain and the PS domain at the same time, the RNC respectively processes the messages of the CS domain and the PS domain, and performs the shunting process separately.

In Step 407, the CN node without the load shunting flag is selected if the CN node matching the user IDNNS does not exist.

In Step 408, it is further determined whether the acquired matching CN node has the shunting flag. If the acquired matching CN node has no the shunting flag, Step 409 is performed; otherwise, Step 410 is performed.

In Step 409, the CN node is selected.

In Step 410, the load shunting is performed according to the configured shunting proportion of the CN.

As above mentioned, when the shunting flag corresponding to the CN node is configured in the RNC, it is necessary to configure the shunting proportion of the CN node with the shunting flag. Further, the corresponding shunting time period may also be configured. Therefore, when the matched CN node acquired according to the value of the IDNNS has the shunting flag, the load shunting is performed according to the configuration information.

During particular implementation, if the current shunting proportion of the CN node does not reach the configured shunting proportion, the CN node without the load shunting flag is selected, and if the current shunting proportion of the CN node reaches the configured shunting proportion, the CN node is selected.

For example, in a certain shunting time period, ten registration services match the same CN node with the shunting flag, the shunting proportion corresponding to the CN node is 10:1, and the shunting is performed on one registration service in the time period. That is to say, another CN node without the load shunting flag is selected for the registration service, and the CN node with the shunting flag is selected for the rest nine registration services.

In Steps 407 and 410, if it is necessary to select the CN node without the load shunting flag, the CN node without the load shunting flag may be randomly selected or selected by a load sharing algorithm, and the message of the user is sent to the selected CN node. The load sharing algorithm may be the existing load sharing algorithm or any other load sharing algorithms.

Figure 5:
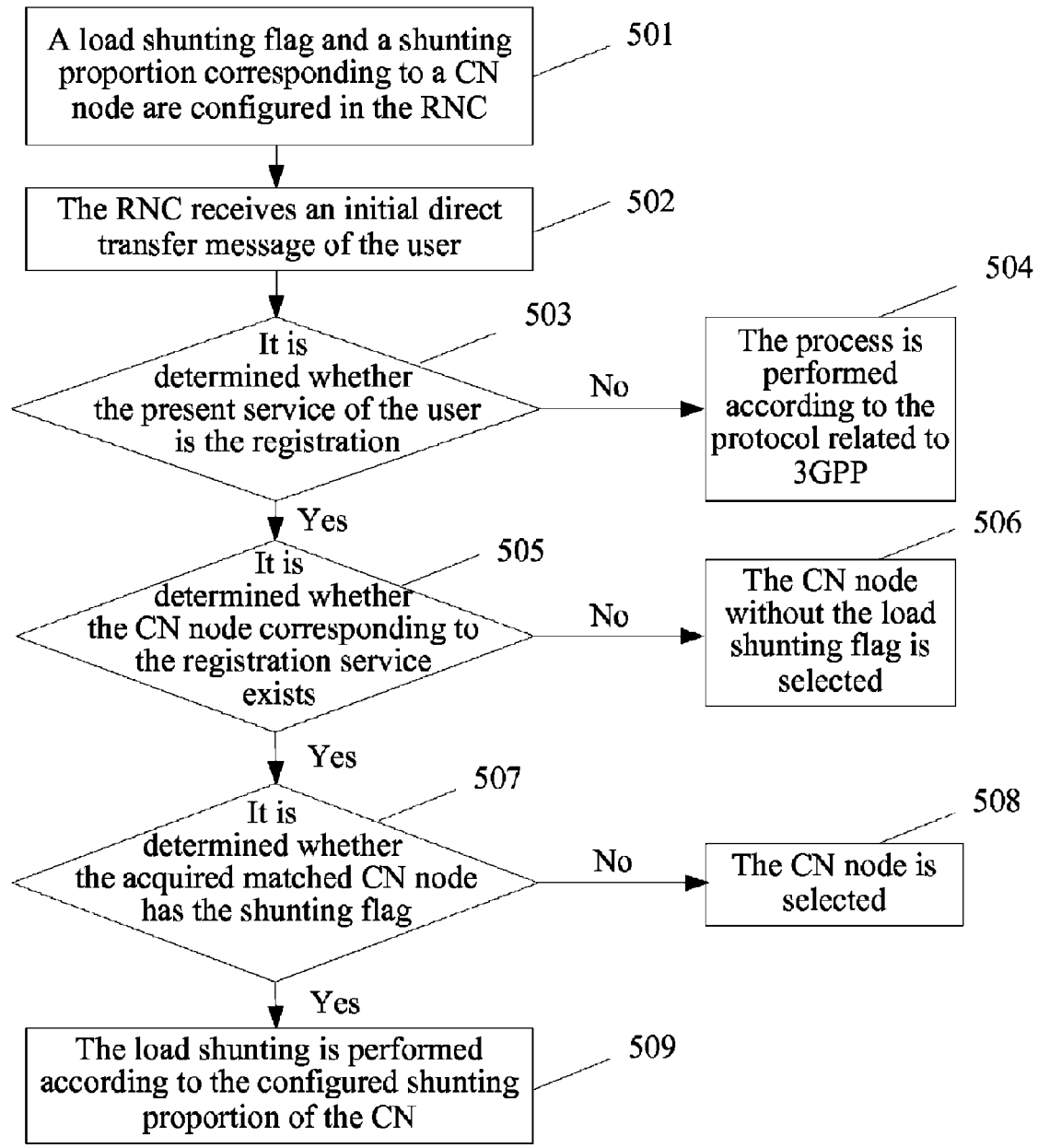
FIG. 5 is a flow chart of a method according to a second embodiment of the present invention.

Referring to FIG. 5, a flow chart of the method according to a second embodiment of the present invention is shown.

Similarly, this embodiment is directed to an IU FLEX networking manner, that is, one RNC is connected to a plurality of CNs of the same operator, for a CS domain, the CN is an MSC, and for a PS domain, the CN is an SGSN.

The flow includes the steps as follows.

In Step 501, a load shunting flag and a shunting proportion corresponding to a CN node are configured in the RNC.

The configuration information in the RNC is the same as that of Step 401 in the embodiment of FIG. 4, so it is not repeated here.

In Step 502, the RNC receives an initial direct transfer message of the user.

In Step 503, it is determined whether the present service of the user is the registration. If the present service of the user is not the registration, Step 504 is performed; otherwise, Step 505 is performed.

The RNC may confirm whether the present service of the user is the registration by resolving the NAS information in the initial direct transfer message. For the initial direct transfer message of the circuit domain, if the NAS is the location registration request, it represents that the service of this time is the registration service. For the initial direct transfer message of the packet domain, if the NAS is the routing area update request or the attachment request, it represents that the service of this time is the registration service.

In Step 504, the process is performed according to the protocol related to 3GPP.

If receiving the initial direct transfer message, the RNC selects one CN node according to the IDNNS, and sends the initial UE message to the CN node.

In Step 505, it is determined whether the CN node corresponding to the registration service exists according to the received initial direct transfer information. If the CN node corresponding to the registration service does not exist, Step 506 is performed; otherwise, Step 507 is performed.

The RNC knows the message comes from the CS domain or the PS domain according to domain flag information in the initial direct transfer message after receiving the initial direct transfer message of the user.

If the initial direct transfer message comes from the CS domain, the IDNNS is derived from the IMSI information carried in the message, the configuration information in the RNC is searched according to a value of the derived IDNNS, and the CN node MSC matching with the value of the IDNNS is acquired.

If the initial direct transfer message comes from the PS domain, the IDNNS is derived from the TMSI or the P-TMSI information carried in the message, the configuration information in the RNC is searched according to a value NRI of the derived IDNNS, and the CN node SGSN matching with the value NRI of the IDNNS is acquired.

In Step 506, the CN node without the load shunting flag is selected if the CN node matching with the user IDNNS does not exist.

In Step 507, it is further determined whether the acquired matching CN node has the shunting flag. If the acquired matching CN node has no the shunting flag, Step 508 is performed; otherwise, Step 509 is performed.

In Step 508, the CN node is selected.

In Step 509, the load shunting is performed according to the configured shunting proportion of the CN.

The solution of the present invention is not only applicable to the load shunting of the CN under the IU FLEX networking manner, but also applicable to the load shunting of the CN under the MOCN networking manner.

Figure 6:
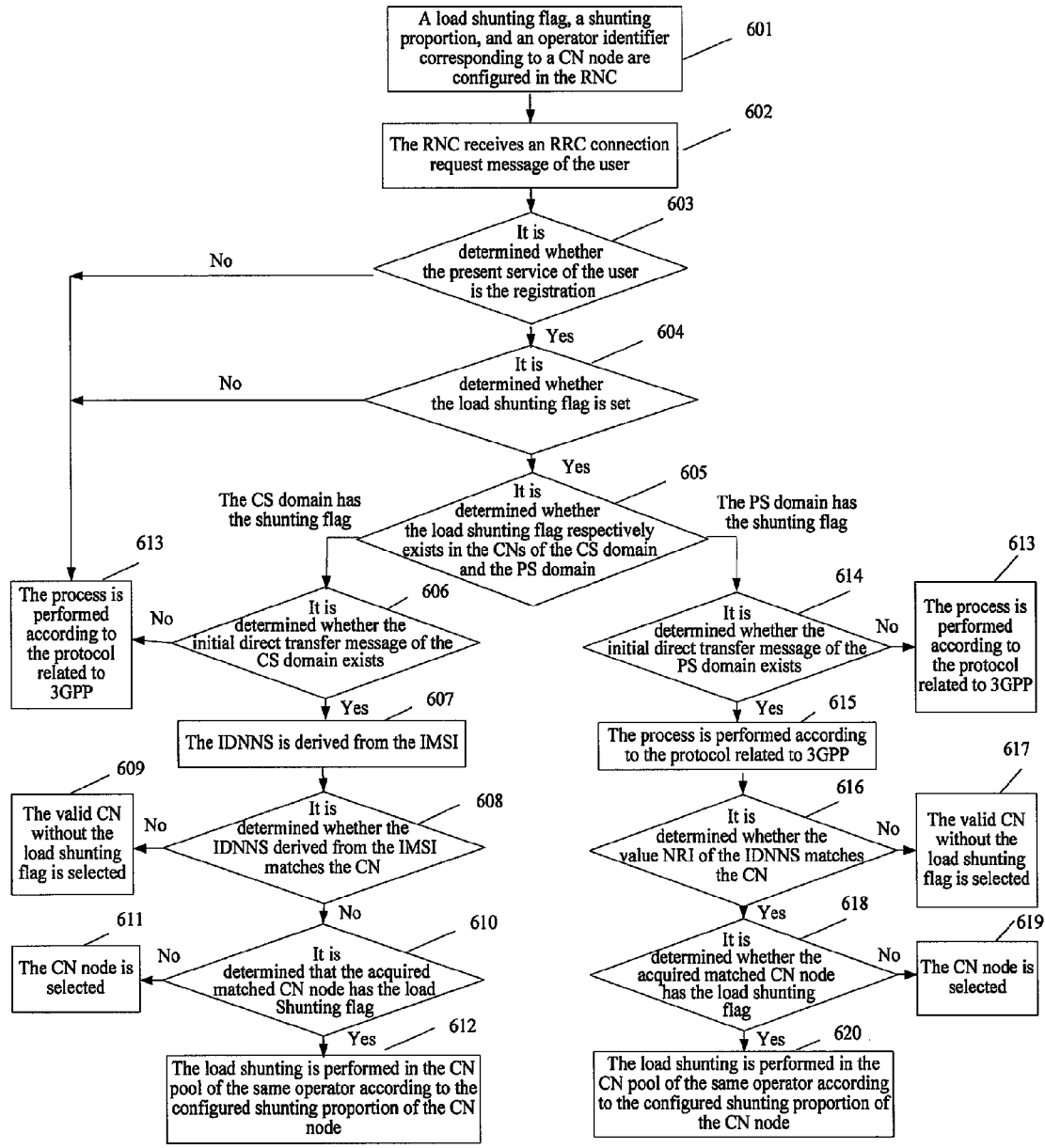
FIG. 6 is a flow chart of a method according to a third embodiment of the present invention.

Referring to FIG. 6, a flow chart of the method according to a third embodiment of the present invention is shown.

This embodiment is directed to the MOCN networking manner, that is, one RNC is connected to a plurality of CNs of different operators at the same time, for the CS domain, the CN is an MSC, and for the PS domain, the CN is an SGSN.

In Step 601, a load shunting flag, a shunting proportion, and an operator identifier corresponding to a CN node are configured in the RNC.

As compared with Step 401 in the first embodiment of FIG. 4, not only the load shunting flag and the shunting proportion corresponding to the CN node are configured in the RNC, but also the operator identifier corresponding to the CN node is configured.

For the MOCN networking manner, one RNC is connected to a plurality of CNs of different operators at the same time, and thus when the load reallocation of the CN is performed, and the message of the shunted CN is sent to other CNs, the RNC needs to identify whether the two CNs are of the same operator or of the CN operators having the shared protocol. That is to say, the shunting can only be performed between the CNs of the same operator or the operators having the shared protocol.

Similarly, the CN nodes of the CS domain and the PS domain are respectively configured by the MSC and the SGSN, and thus the shunting of the MSC and the SGSN is separately processed in the RNC without the mutual effects.

In addition, in order to reduce the effect on the existing network service for the process of the service reallocation of the CN and ensure that the process of the service reallocation of the CN is performed in the reasonable time, a load shunting time period corresponding to the CN node is configured in the RNC, and the shunting time period includes a starting time and an ending time. The time period from the starting time to the ending time may be a continuous time period or a plurality of discontinuous time periods. The periodical LU/RAU (location update/routing area update) time may serve as one unit, and the load shunting proportion may be respectively set in each unit. The load shunting flag, the starting time and the ending time of the load reallocation, and the shunting proportion may be respectively set in each CN node which needs the load shunting. At the same moment, the load shunting flags of all the CNs in the pool area cannot be set at the same time, so as to reduce the impact of the shunting process on the existing network.

In Step 602, the RNC receives an RRC connection request message of the user.

In Step 603, it is determined whether the present service of the user is the registration. If the present service of the user is not the registration, Step 604 is performed; otherwise, Step 613 is performed.

The RNC may confirm whether the present service of the user is the registration through a connection establishment reason cell in the RRC request message. The connection establishment reason is a mandatory cell in the RRC connection request message.

The RNC may also confirm whether the present service of the user is the registration service through the NAS in the initial direct transfer message of the user. If the NAS is the location registration request for the CS domain, or the routing area update request or the attachment request for the PS domain, it is determined that the present service of the user is the registration service.

In Step 604, it is determined whether the load shunting flag is set in the RNC. If the load shunting flag is set in the RNC, Step 605 is performed; otherwise, Step 613 is performed.

In Step 605, it is determined whether the load shunting flag respectively exists in the CNs of the CS domain and the PS domain. If the CS domain has the shunting flag, Step 606 is performed, and if the PS domain has the shunting flag, Step 614 is performed.

In Step 606, it is determined whether the initial direct transfer message of the CS domain exists. If the initial direct transfer message of the CS domain does not exist, Step 613 is performed; otherwise, Step 607 is performed.

In Step 607, the IDNNS is derived from the IMSI.

In Step 608, it is determined whether the IDNNS derived from the IMSI matches the CN. If the IDNNS derived from the IMSI does not match the CN, Step 609 is performed; otherwise, Step 610 is performed.

In Step 609, the valid CN without the load shunting flag is selected if the value of the IDNNS is invalid or cannot match the CN node.

In Step 610, it is further determined whether the acquired matched CN node has the load shunting flag. If the acquired matched CN node has no the load shunting flag, Step 611 is performed; otherwise, Step 612 is performed.

In Step 611, the acquired matched CN node without the load shunting flag is selected.

In Step 612, the load shunting is performed in the CN pool of the same operator according to the configured shunting proportion of the CN node.

In Step 613, the process is performed according to the protocol related to 3GPPl.

If receiving the initial direct transfer message, the RNC selects one CN node according to the IDNNS, and sends the initial UE message to the CN node.

In Step 614, it is determined whether the initial direct transfer message of the PS domain exists. If the initial direct transfer message of the PS domain does not exist, Step 613 is performed; otherwise, Step 615 is performed.

In Step 615, the IDNNS is derived from the TMSI or the P-TMSI.

In Step 616, it is determined whether the IDNNS derived from the TMSI or the P-TMSI matches the CN. If the IDNNS derived from the TMSI or the P-TMSI does not match the CN, Step 617 is performed; otherwise, Step 618 is performed.

In Step 617, if the value of the IDNNS is invalid or cannot match the CN node, the valid CN without the load shunting flag is selected.

In Step 618, it is further determined whether the acquired matched CN node has the load shunting flag. If the acquired matched CN node has no the load shunting flag, Step 619 is performed; otherwise, Step 620 is performed.

In Step 619, the acquired matched CN node without the load shunting flag is selected.

In Step 620, the load shunting is performed in the CN pool of the same operator according to the configured shunting proportion of the CN node.

In Steps 609 and 617, if it is necessary to select the CN node without the load shunting flag, the CN node without the load shunting flag may be randomly selected or selected by a load sharing algorithm, and the message of the user is sent to the selected CN node.

If the user initiates the initial direct transfer messages of the CS domain and the PS domain simultaneously after one RRC connection request, the RNC respectively processes the initial direct transfer messages of the CS domain and the PS domain, and performs the shunting process separately.

For the LU/RAU/ATTACH during the process that the CN user having been registered in the pool area is shunted to a new CN or the CN restored from the failure, the TMSI/P-TMSI is allocated by the originally registered CN, so the current CN may initiate a de-identification flow, thereby reducing the interaction with the HLR due to a great deal of users changing their CNs.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope and sprit of the following claims and their equivalents.

What is claimed is:

1. A method for realizing a service reallocation, wherein a load shunting flag and a shunting proportion corresponding to a core network (CN) node are configured in a radio network controller (RNC), and the method comprises:

acquiring, by the RNC, the CN node corresponding to a registration service when the RNC receives a message of a user and determines that a service requested by the user is the registration service;

selecting the CN node if the CN node has no load shunting flag; and performing a load shunting according to the configured shunting proportion of the CN if the CN node has the load shunting flag.

2. The method according to claim 1, wherein when the message of the user received by the RNC is a radio resource control (RRC) connection request message and if a connection establishment reason cell in the RRC connection request message is registration, it is determined that the present service of the user is a registration service.

3. The method according to claim 1, wherein when the message of the user received by the RNC is an initial direct transfer message of the user and if a non-access stratum (NAS) message in the initial direct transfer message of the user is a location registration request, a routing area update request, or an attachment request, it is determined that the present service of the user is a registration service.

4. The method according to claim 1, wherein the acquiring the CN node corresponding to the registration service comprises:

acquiring, by the RNC, an intra domain NAS node selector (IDNNS) according to a received circuit domain or packet domain initial direct transfer message of the user; and selecting a CN node matching with and corresponding to the IDNNS according to the IDNNS.

5. The method according to claim 4, wherein the acquiring, by the RNC, the IDNNS according to the received circuit domain initial direct transfer message of the user comprises:

deriving the IDNNS of the user from an international mobile subscriber identifier (IMSI) in the circuit domain initial direct transfer message; and the IDNNS according to the received packet domain initial direct transfer message of the user comprises:

deriving the IDNNS of the user from a temporary mobile subscriber identity (TMSI) or a packet-TMSI (P-TMSI) in the packet domain initial direct transfer message.

6. The method according to claim 4, further comprising:

selecting the CN node without the load shunting flag if the matching CN node is not acquired according to a value of the resolved IDNNS.

7. The method according to claim 1, wherein the performing the load shunting according to the configured shunting proportion of the CN specifically comprises:

selecting a CN node without the load shunting flag if the current shunting proportion of the CN node does not reach the configured shunting proportion; and selecting the CN node if the current shunting proportion of the CN node reaches the configured shunting proportion.

8. The method according to claim 6, wherein the selecting the CN node without the load shunting flag comprises:
randomly selecting the CN node without the load shunting flag or selecting the CN node without the load shunting flag by a load sharing algorithm.

9. The method according to claim 6, further comprising:
configuring an operator identifier corresponding to the CN node in the RNC.

10. The method according to claim 9, wherein the selecting the CN node without the load shunting flag comprises:
randomly selecting or selecting by a load sharing algorithm the CN node without the load shunting flag and having the same operator identifier as the CN node.

11. The method according to claim 1, further comprising:
configuring a load shunting time period corresponding to the CN node in the RNC, wherein the shunting time period comprises a starting time and an ending time.

12. The method according to claim 11, wherein each load shunting flag corresponds to one continuous shunting time period or a plurality of discontinuous shunting time periods, and each continuous time period is an integral multiple of a periodical location registration or of a periodical routing area update timer length.

13. The method according to claim 12, further comprising:
setting the shunting proportion corresponding to each shunting time period.

14. The method according to claim 13, wherein the performing the load shunting according to the configured shunting proportion of the CN comprises:
performing the load shunting according to the shunting proportion corresponding to the shunting time period in the shunting time period.

15. A system for realizing a service reallocation, comprising a radio network controller (RNC) which communicates with a core network (CN), wherein:
the RNC is configured to configure a load shunting flag and a shunting proportion corresponding to the CN node, determine whether a service requested by a user is a registration service, and
select the CN according to load relevant information, and perform a load shunting;
wherein when the RNC receives a message of the user and the RNC determines that the service requested by the user is the registration service, the CN node corresponding to the registration service is acquired;
the CN node is selected if the CN node has no load shunting flag; and
the load shunting is performed according to the configured shunting proportion of the CN if the CN node has the load shunting flag.

16. The system according to claim 15, wherein the RNC determines whether the service requested by the user is the registration service through a condition as follows:
confirming that the present service of the user is the registration service if a connection establishment reason cell in a radio resource control (RRC) connection request message received by the RNC is registration.

17. The system according to claim 15, wherein the CN node corresponding to the registration service is acquired through the procedures as follows:
the RNC acquiring an intra domain NAS node selector (IDNNS) according to a received circuit domain and/or packet domain initial direct transfer message of the user; and
selecting the CN node matching with and corresponding to the IDNNS according to the IDNNS.

18. The system according to claim 15, wherein the RNC performs the load shunting according to the configured shunting proportion of the CN,
the RNC selects the CN node without the load shunting flag if the current shunting proportion of the CN node does not reach the configured shunting proportion; and
the RNC selects the CN node if the current shunting proportion of the CN node reaches the configured shunting proportion.

19. The system according to claim 15, wherein the RNC configures a load shunting time period corresponding to the CN node, each load shunting flag corresponds to one continuous shunting time period or a plurality of discontinuous shunting time periods, and each continuous time period is an integral multiple of a periodical location registration or of a periodical routing area update timer length.

* * * * *

UNITED STATES PATENT AND TRADEMARK OFFICE
CERTIFICATE OF CORRECTION

PATENT NO. : 8,208,453 B2 Page 1 of 1
APPLICATION NO. : 12/370179
DATED : June 26, 2012
INVENTOR(S) : Chuanhui Tao It is certified that error appears in the above-identified patent and that said Letters Patent is hereby corrected as shown below:

Column 12, line 26, "theRNC" should read -- the RNC --.

Signed and Sealed this
Twenty-eighth Day of August, 2012

David J. Kappos
*Director of the United States Patent and Trademark Office*